United States Patent [19]

Lemoine

[11] 4,212,027
[45] Jul. 8, 1980

[54] TIME BASE COMPENSATOR

[75] Inventor: Maurice G. Lemoine, Redwood City, Calif.

[73] Assignee: Ampex Corporation, Redwood City, Calif.

[21] Appl. No.: 557,708

[22] Filed: Mar. 12, 1975

Related U.S. Application Data

[63] Continuation of Ser. No. 464,269, Apr. 25, 1974, abandoned.

[51] Int. Cl.² .............................................. H04N 9/02
[52] U.S. Cl. .......................................... 358/8; 358/17; 360/36
[58] Field of Search ................... 178/69.5 R, 69.5 TV, 178/69.5 CB, DIG. 3; 358/8, 17, 19, 264, 274–279; 360/36, 10; 340/347 AD, 347 SH; 235/154

[56] References Cited

U.S. PATENT DOCUMENTS

| | | | |
|---|---|---|---|
| 3,548,095 | 12/1970 | Poulett | 360/10 |
| 3,666,880 | 5/1972 | Krause | 358/8 |
| 3,720,780 | 3/1973 | Remy et al. | 178/DIG. 3 |
| 3,748,386 | 7/1973 | Monney et al. | 360/36 |
| 3,758,711 | 9/1973 | Crosno | 360/36 |
| 3,763,317 | 10/1973 | Coleman, Jr. et al. | 178/69.5 TV |
| 3,860,952 | 1/1975 | Tallent et al. | 360/36 |
| 3,909,839 | 9/1975 | Inaba et al. | 358/8 |

*Primary Examiner*—Errol A. Krass
*Attorney, Agent, or Firm*—Robert G. Clay; Ralph L. Mossino

[57] ABSTRACT

Timing errors in a color television signal equal to a fraction of the nominal period of one cycle of color burst are corrected by clocking an analog-to-digital converter during each horizontal line interval of the television signal with two clock signals having the same nominal frequency equal to a multiple of that of the color burst. During the color burst interval of each horizontal line, the analog-to-digital converter is clocked by a stable time base reference clock signal and the obtained digitized color burst is stored in a recyclable digital memory. Following the color burst interval, the stored digitized color burst is regenerated for the remainder of the horizontal line and a clock signal derived for use in clocking the analog-to-digital converter. The digitized television signal provided by the analog-to-digital converter is written into a clock isolator at times determined by the clock signal derived from the digitized color burst and, thereafter, read from the clock isolator at times determined by the reference clock signal. Timing errors exceeding the nominal period of one color burst cycle are corrected by writing the digitized television signal from the clock isolator into a following random access memory and incrementally adjusting the memory's read time in accordance with such errors measured in steps equal to the period of one color burst cycle. The stable time base reference clock signal is coupled to control the signal processing following passage through the clock isolator.

89 Claims, 6 Drawing Figures

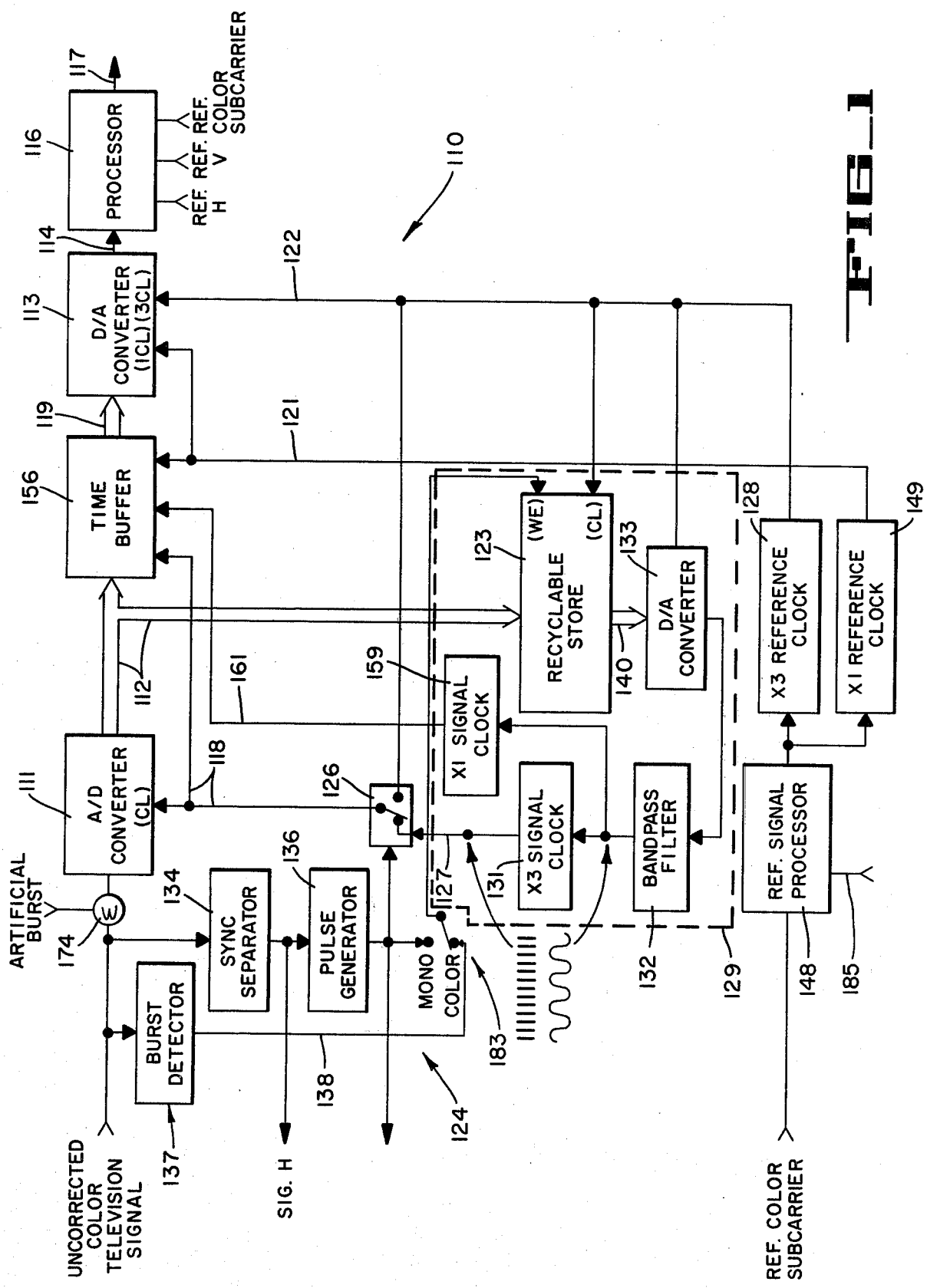
FIG_1

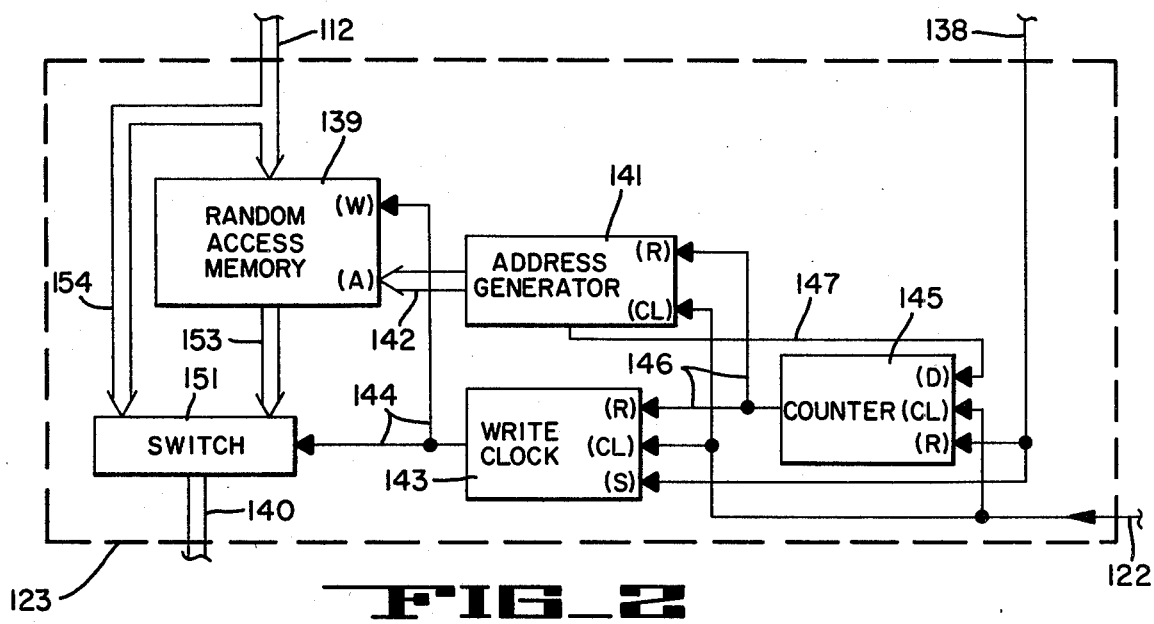
FIG_2
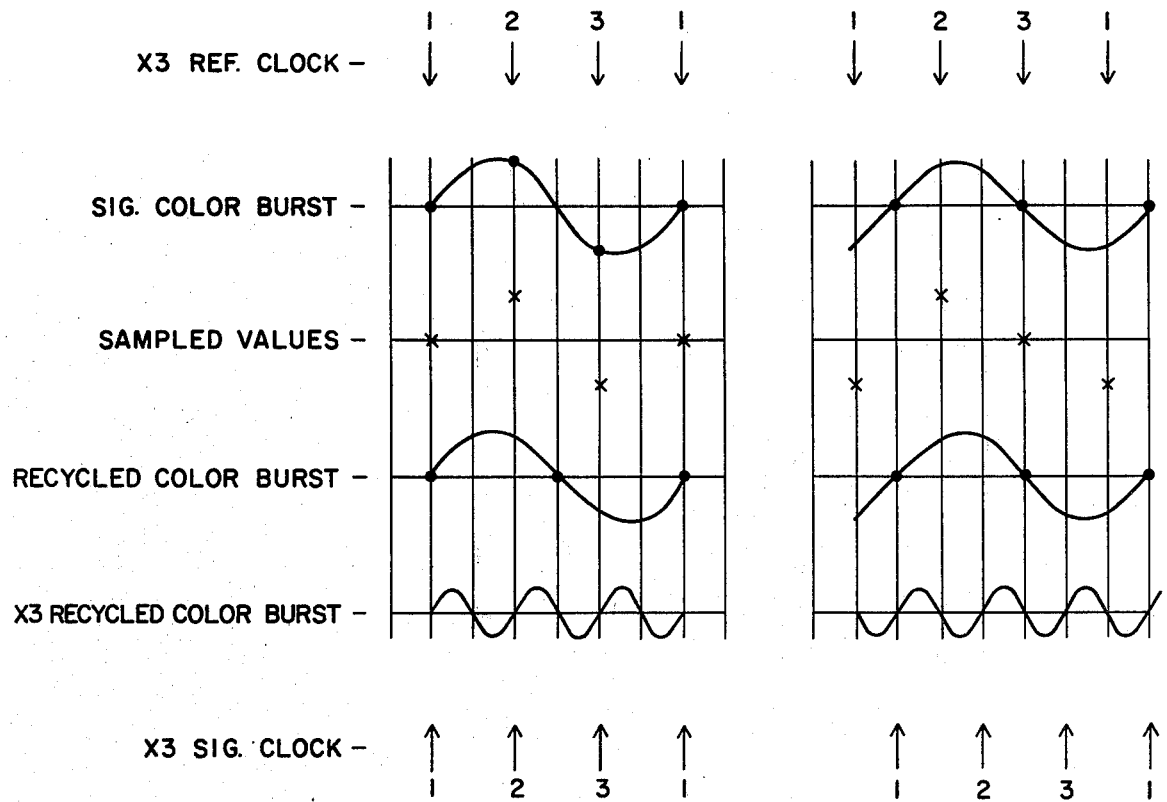
FIG_3A  FIG_3B

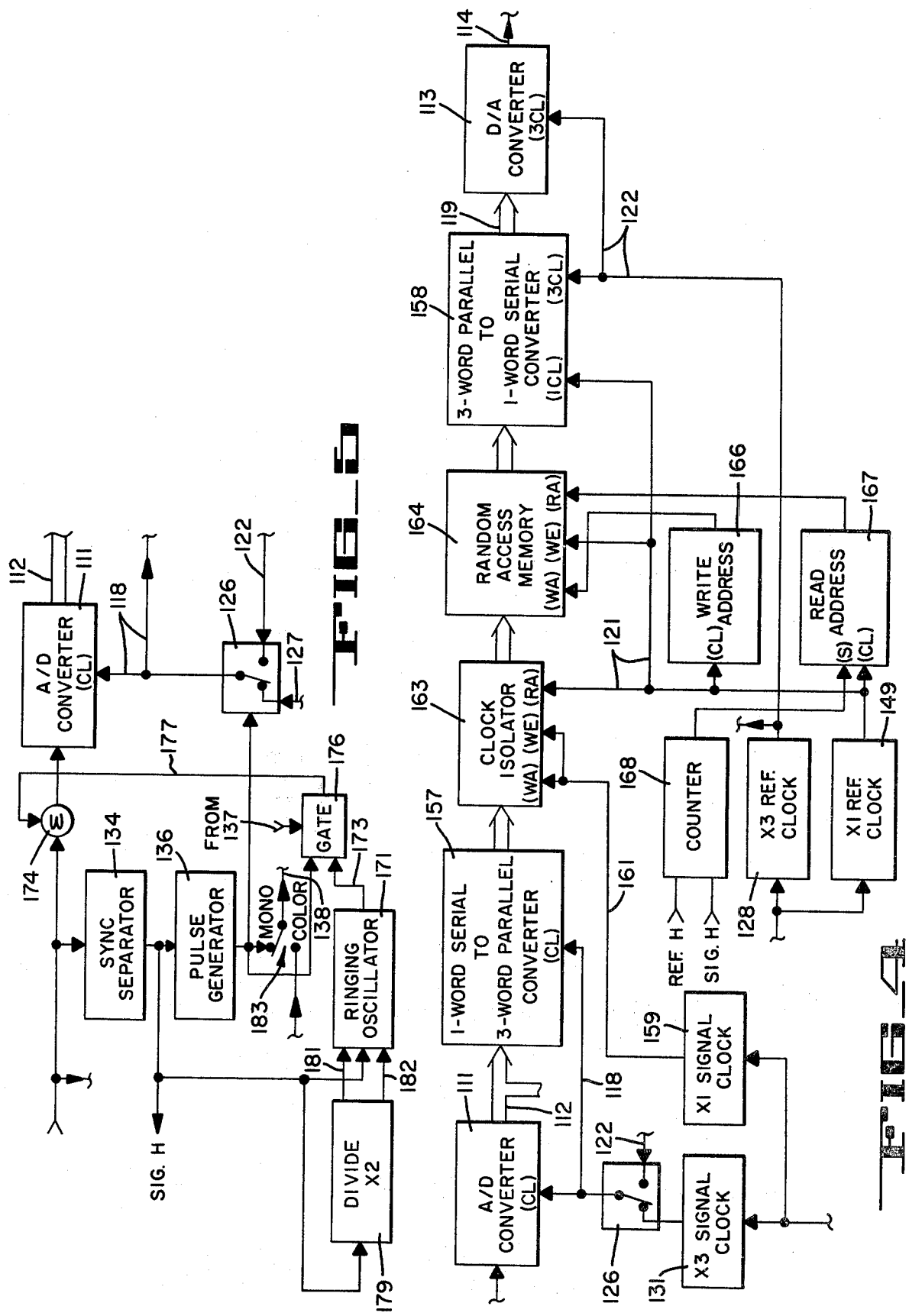

TIME BASE COMPENSATOR

FIELD OF THE INVENTION

In general, this invention relates to techniques of altering, i.e., changing, the timing of electrical signals. More particularly, however, it concerns a time altering technique especially suited for electronically correcting undesirable timing differences between electrical signals.

BACKGROUND OF THE INVENTION

During the processing of electrical signals for signal transformation, analysis or correction, frequently the timing of the signal must be altered or compensated. For example, signal timing compensation is commonly employed to correct undesirable timing differences between signals having recurrent timing components. Alteration of signal timing to correct undesirable timing differences is particularly important when a signal undergoes transformations between different domains, such as occur in recording and reproducing signals on magnetic or other forms of record media. During the recording and reproduction processes, the time function of the signal is transformed into a space function and then back into the time function. As the signal undergoes the transformations, timing or time-base errors are often introduced to the signal. The dynamic or time variant class of such time-base errors prevents the achievement of the necessary transient-free and time-stable signal reproduction required in high resolution signal processing systems. For example, time-stable signal generation is desirable in all television signal processing systems and highly stable generation mandatory in systems used to prepare television signals for public transmission.

Two techniques are employed to correct undesirable timing errors in signals reproduced from a record medium; electro-mechanical and electronic. Electro-mechanical techniques are employed to correct gross timing errors and achieve such correction by synchronizing the operation of the signal recording and reproducing equipment. Electronic techniques are employed to correct smaller residual timing errors not corrected by the electro-mechanical devices and achieve such correction by phase adjusting the signal. It is the electronic technique of time-base error correction to which the present invention is relevant.

Heretofore, electronic signal timing alteration systems have employed adjustable time delay devices inserted in the signal path to correct time-base errors. In such systems, the time-base error is measured and the amount of time delay inserted in the signal path adjusted to compensate for and, thereby, correct the measured time-base error. One particular type of system which enjoys widespread use has a voltage variable delay line in which lumped constant inductors and voltage variable capacitive diodes are interconnected in a delay line configuration. A voltage, corresponding to the measured time-base error, is applied to the variable capacitive diodes to fix the necessary delay for correcting the time-base error. A description of a voltage variable delay line type signal timing alteration system can be had by reference to U.S. Pat. No. 3,202,769.

In another type of electronic signal timing alteration system, a number of fixed delay lines or a single delay line with a series of taps spaced therealong are arranged in combination by electronic switches. Time-base errors are corrected by operating the switches in accordance with the measured error to selectively insert the necessary corrective delay in the signal path. A fixed delay line type signal alteration system is described in U.S. Pat. No. 3,763,317 and a tapped delay line type signal timing alteration system is described in U.S. Pat. No. 3,748,386.

Recently, digital delay devices, such as clocked storage registers, have been used in systems for correcting time-base errors in analog signals. In the digital systems, the analog signal being corrected is digitized, corrected and regenerated. Correction is performed by entering or writing the digitized signal in an adjustable storage register at a fixed rate determined by a reference clock signal. The storage register is adjusted to correct timing errors by reading the signal from the register at a faster or slower rate, depending upon the error. This technique of constant write rate and variable read rate cannot handle large discontinuous or incremental time-base changes in the signal. In tape recorders, such incremental time-base changes are caused by anomalies in their operation and most commonly when switching between heads.

In signal timing alteration systems, especially those arranged to eliminate time-base errors and provide a high degree of signal time-base stability, it has been the practice to cascade coarse correction devices and fine correction devices. Voltage variable delay line systems have been used to provide the desired fine correction while switched delay line systems have been used to provide the coarser corrections. Because all such delay line systems are analog devices, they are prone to drift and have other disadvantages characteristic of analog devices. Incremental time-base changes that occur as a result of anomalies in the operation of tape recorders often cause errors or costly interruptions in the performance of signal processing operations because of the inability of these time-base error correction devices to respond to the incremental changes. Also, if a large range of timing errors is required to be corrected, large and complex correction systems are necessary.

Considerable advantage is therefore to be gained by utilizing a technique to perform signal timing compensation that is able to effect all time alterations, including incremental, without error. Additional advantages will be realized in the performance of such signal timing compensation by first altering the signal timing by any fraction of a known interval required to bring the signal within an integral number of known intervals of the desired timing and, thereafter, altering the signal timing by such integral number of known intervals.

SUMMARY OF THE INVENTION

A feature of this invention is the utilization of digital techniques to alter signal timings which enable digital circuits to be employed that are far less expensive to construct and maintain than analog circuits. Another feature of this invention is that timing compensation can be performed without the need of an analog measurement of the amount of compensation desired, thereby avoiding all of the disadvantages characteristic of analog measurement circuitry. It is yet another feature of this invention to re-time the signal by temporarily storing the signal in a time buffer at a time adjusted in accordance with the desired timing change while maintaining the storage retrieval time fixed relative to an established timing reference. A further feature of this invention is that further incremental alterations in the timing of a signal can be performed without error by adjusting the further storage retrieval time of the signal in accordance with a desired timing change while maintaining the storage entry time fixed relative to an established timing reference. Still another feature of this invention is that alterations in the timing of a signal greater than one principal division of the time base, as determined by the period of one cycle of the signal's timing component, can be performed by first altering the signal timing by any desired amount corresponding to a fraction of the principal time base division and thereafter further incrementally altering the signal timing by any desired amount corresponding to an integral number of principal time base divisions. Yet another feature of this invention is that timing alterations are performed by the use of a derived control signal which reduces the effect of noise to a large degree. These and other features of this invention provide particular advantages when the invention is employed to eliminate time-bass errors in television signals reproduced from video recording equipment.

In accordance with this invention, an information signal whose timing is to be altered, i.e., compensated, is sampled to obtain representations of the signal. The information signal must contain or be provided with a timing component, appearing at least at intervals of the information signal. A timing reference, such as a clock signal having a frequency that remains stable relative to the nominal frequency of the timing component associated with the uncompensated information signal, is initially employed to control the sampling time and rate. The reference clock signal must be generated relative to the occurrence of the information signal so that at least a portion of the information signal's timing component is sampled at intervals. Such sampling must be sufficient to permit regeneration of the timing component from the representations thereof.

As the timing component is sampled under the control of the stable reference clock signal, the representative samples are stored and, thereafter, used to regenerate a representation of the timing component, which is frequency stable relative to and phase coherent with the original timing component associated with the uncompensated information signal. An information clock signal is derived from the regenerated timing component so that its frequency and phase characteristics are stable relative to those of the regenerated, hence, original timing component associated with the information signal. During the interval of the information signal following the portion of the timing component from which the information clock signal is derived, the derived information clock signal is used to time or control additional processing of the information signal for the introduction of the desired amount of timing alteration.

The use of a derived clock signal obtained in the above described manner provides particular advantages in the further processing of an information signal such as, for example, a television signal to alter the signal timing for the purpose of eliminating timing differences or time-base errors that commonly occur in such signals. When employing the technique of this invention to eliminate time-base errors, that occur in the television signal, the frequency and phase of the reference clock signal is maintained fixed and the derived clock signal is employed to time the further sampling of the information signal during the interval following the portion of the information signal's timing component from which the information clock signal is derived. To eliminate time-base errors from color television signals, the information clock signal is derived from the color synchronizing burst that occurs at the beginning of each horizontal line interval of the composite color television signal. The thusly derived clock signal is employed to time the sampling of the video information signal component following the synchronizing period located at the beginning of each horizontal line of the television signal.

Following the further sampling, the obtained representations of the video signal are written in a clock isolator or time buffer at times determined by the derived clock signal. Thereafter, the video signal representations are read from the buffer at a time determined by the fixed or stable frequency and phase reference clock signal. In this fashion, the time buffer serves to re-time the video signal representations relative to the reference clock signal. The original form of the video signal may be regenerated from the re-timed sampled representations read from the buffer.

The use of the derived clock signal to time the further processing or sampling of an information signal is one of the fundamental features of this invention that facilitates the alteration of signal timing. As described hereinabove, the derivation of the information clock signal locks the frequency and phase of the derived clock signal relative to those of the timing component contained in the information signal. Therefore, the timing of the derived clock signal will follow changes in the relative timing between the information signal and the timing reference. Because the timing of the derived clock signal is locked to that of the information signal and the derived clock signal is used to control the further sampling of the information signal, the information signal will always be further sampled at the same points during its interval regardless of the relative timing between the information signal and timing reference. Changes in the relative timing between the information signal and timing reference will not change the sample point during the information signal interval. This enables the thusly sampled information signal to be re-timed relative to any desired timing reference, regardless of changes in the relative timing between the information signal and timing reference. As will become readily apparent upon consideration of the following detailed descriptions of preferred embodiments of the signal timing alteration technique of this invention, the derivation and use of the information clock signal to further sample the information signal enables outstanding advantages to be realized in the implementation of the technique, the most significant of which is the precise time-base error corrections of television signals with a high degree of reliability.

Ordinarily, the timing component of an information signal is a simple periodic signal. However, some information signals, such as television signals, have several timing components arranged to define principal periods and sub-periods of the information signal. Because such timing components have different frequencies, it is possible in some circumstances for sub-periods to appear properly aligned relative to a reference even though the higher ordered periods are not properly aligned. To avoid the possible harmful effects that could be caused by a false indication of proper timing alignment, the highest frequency timing component is selected for deriving the information clock signal. Signal timing compensation up to one cycle of the highest frequency timing component are automatically provided by the above described technique of using the derived information clock signal to further sample the information signal. If signal timing compensations greater than one cycle of the highest frequency timing component are necessary to achieve the proper timing alignment, the information signal is further examined to determine the number of full cycles it must further be altered to properly align its timing. The required further alteration is accomplished by storing the sampled representations in a memory for a number of cycles corresponding to the determination. Preferably, the further alteration is performed after the sampled representations have passed through the timing buffer.

In addition to altering the timing of an information signal to eliminate undesirable differences, the signal timing compensation in accordance with this invention can be employed to introduce wanted timing changes in an information signal. Such wanted timing changes are introduced by altering the timing of the reference clock signal in accordance with the wanted timing changes. In other respects, the signal timing compensation of this invention is performed as described above with reference to the elimination of time-base errors. Altering the timing of reference clock signal causes a change in the relative timing between the reference clock signal and timing component contained in the information signal. As previously explained, such relative signal timing change introduces a comparable timing difference between the timing of the sampling of the information signal and that of the time altered reference clock signal. Therefore, reading the samples of the information signal from the timing buffer at times determined by the time altered reference clock signal results in the re-timing of the information signal relative to the altered reference signal and, thereby, the introduction of the wanted timing changes in the information signal.

As will be appreciated from the foregoing, signal timing compensation in accordance with the present invention is easily adaptable to digitalization and, therefore, is able to benefit from the advantages that can be gained by the use of digital circuits. Furthermore, the ability to alter the timing of an information signal first by a fraction of a known interval and, thereafter by any amount equal to an integral number of such intervals, regardless of the size of the time alteration, has the advantage of avoiding the limitations associated with cascading analog time alteration devices.

BRIEF DESCRIPTION OF THE DRAWINGS

The foregoing as well as other features and advantages of the signal timing alteration technique of this invention will become more apparent upon the consideration of the following detailed description and claims together with the accompanying drawings of which:

FIG. 1 is a block diagram of a digital time-base error corrector in accordance with this invention adapted for a color television signal;

FIG. 2 is a detailed block diagram illustrating the construction of the recyclable digital storage of the corrector of FIG. 1;

FIGS. 3A and 3B are timing diagrams illustrating the operation of the signal timing compensation in accordance with this invention in eliminating time-base errors from color television signals;

FIG. 4 illustrates circuits in block form that permit the time-base error corrector of FIG. 1 to correct errors greater than one cycle of the signal's color synchronizing burst.

FIG. 5 illustrates circuits in block form that permit the time-base error corrector embodiments of FIGS. 1 and 4 to operate when the incoming signal is a monochrome television signal.

DESCRIPTION OF PREFERRED EMBODIMENTS

The signal timing compensator 110 in accordance with the present invention is shown in FIG. 1 as arranged to eliminate time-base errors present in a color television information signal reproduced by a video recorder (not shown), such as a magnetic disc recorder. However, it will be appreciated that the principles of this invention are equally applicable for performing other signal timing compensations, such as in video tape recorders, correcting time-base errors present in other information signals, eliminating differences in relative times of signals and purposely altering the timing of signals. With particular reference to FIG. 1, the uncorrected color television signal reproduced by the disc recorder is applied to the input of an analog-to-digital (A/D) converter 111, which is operable to provide at its output 112 an encoded signal in the form of a pulse code modulated representation of the television signal. This digitized signal is further processed to be eventually coupled error-free to a digital-to-analog (D/A) converter 113, which decodes the digitized signal and issues at an output 114 the television signal in analog form. Because the synchronizing components included in the television signal issued by the D/A converter 113 usually are misshaped and contain undesirable transients as a result of its passage through the compensator 110, the television signal is coupled to an output processor 116 of the type commonly used in video recorders. Such processors 116 operate to strip the synchronizing components from the incoming television signal and insert new properly shaped and timed synchronizing components into the signal to form the desired composite television signal at its output 117.

In the compensator 110 of the invention, the encoding A/D converter 111 provides a multi-bit word at output 112 each time the converter 111 is clocked by a clocking signal applied over a line 118, as shown. The converter 111 is clocked to sample the instantaneous analog amplitude of the incoming television signal, such that a succession of binary output words is developed, each word consisting of a number of binary bits, which bits together represent a particular amplitude level in a binary format. In general, this operation of analog-to-digital conversion may be referred to as pulse code modulation of the incoming signal. The reverse to this operation is performed by the decoding D/A converter 113. The decoding converter 113 receives the binary encoded words at an input coupled to line 119 and, in response to a succession of reference clocking signals received over lines 121 and 122, issues a decoded analog television signal to an output processor 116, which communicates the corrected television signal to the output 117. In accordance with this invention, the time-base error compensation is achieved by deriving a clock signal from a timing component included in the television signal so that the clock time of the derived clock signal is coherent with the timing component. The derived clock signal is employed to clock the A/D converter 111 to sample the uncorrected television signal and effect the encoding of the television signal into the digital binary word representations. After encoding, the digitized television signal is time buffered and decoded at the D/A converter 113 by a clock signal at a clock time coherent with a reference timing signal, such as a reference color subcarrier. As a result of such buffering and decoding, the decoded television signal is rendered in-phase with the reference color subcarrier.

In the case of a color television signal, precise timing corrections can be achieved by deriving the information-signal-related clock signal from the color synchronizing burst located on the back porch of each horizontal line blanking interval. The derivation is achieved by coupling to the input of a recyclable digital store 123 binary word representations of one or more cycles of the signal's color burst available at output 112 of the A/D converter 111. The store 123 provides a digital memory circuit for a plurality of binary words corresponding to the amplitude levels of the signal's color burst at sample times. By storing the binary words available during the sampling of the signal's color burst timing component, sufficient information is memorized in store 123 for repetitively reproducing a full cycle of the color burst such that a continuous signal identical to the uncorrected television signal's color burst can be developed lasting beyond the duration of the signal's color burst. The derived clock signal is obtained by further processing the continuous signal and is employed to digitize the remainder of the horizontal line of the television signal from which the continuous signal is reproduced.

To insure that the continuous signal, hence, derived clock signal reproduced from the color burst samples stored in the recyclable store 123 remains in-phase with the color burst, hence, uncorrected television signal, the A/D converter 111 is clocked during the sampling of the television signal's color burst and storing of the resulting samples by a second clock signal at a clock time coherent with the reference clock signal. Thus, the A/D converter 111 must be clocked by two clock control signals over line 118. The initial clocking occurs during a sampling and storing mode, preferably, lasting for several cycles of the color burst timing component. During this initial mode, the clock input (CL) of A/D converter 111 receives over line 118 a clock control signal locked in-phase to the reference clock signal. The A/D converter 111 is clocked by the second, derived clock control signal received over line 118 during a following recycling mode, which lasts for the remainder of the horizontal line interval after the initial clocking. For these two modes of operation, a switching means generally indicated at 124 is provided having a switching device 126 disposed in a first or sampling and storing state connecting the line 118 to the clock output line 122 from a X3 reference clock source 128. Switching device 126 is actuable to a second or recycling state, which connects line 118 to the derived clock signal provided by a digital memory circuit 129 over line 127. In its recycling mode, switching device 126 connects the clock input (CL) of the A/D converter 111 with a X3 signal clock 131 providing a clock output for memory circuit 129. The X3 signal clock 131 is responsive through a bandpass filter 132 to an output of a D/A converter 133. The D/A converter 133 converts the binary word representations of the signal color burst recycled in the recyclable store 123 into an analog form. Accordingly, the signal available from the D/A converter 133 appears as a continuous unfiltered replica of the original timing component, which, in this peferred embodiment, is a sinusoidal color burst of a television signal. The bandpass filter 132 is set to provide a center frequency equal to that of the color burst of the signal being corrected, which in the case of a NTSC standardized color television signal is a frequency of 3.58 megahertz. Filter 132 in its location between the output of D/A converter 133 and an input to X3 signal clock 131 has been found to provide an advantageous restoration of the color burst frequency following the various conversion and digital storage manipulations. If a number of signal color burst cycles are smapled and stored in store 123 for reproducing the derived clock signal, the filter 132 will average any noise contained in the recycled signal color burst over the number of stored cycles, thereby improving the timing accuracy of the derived clock signal.

As indicated above, switching device 126 of switching means 124 is normally in its illustrated recycling state, connecting X3 signal clock 131 to the clock input (CL) of the A/D converter 111 so as to control the sampling and time the encoding of the uncorrected television signal with the recycled color burst samples derived from the signal. To provide for the actuation of switching device 126 to its other sampling and storing state, switching means 124 includes circuitry for detecting the occurrence of the color burst timing component in the television signal and responsively operating device 126 in accordance therewith. In particular, a sync separator 134 is provided for detecting at the input of the compensator 110 the occurrence of each horizontal synch pulse (SIG H) appearing during the blanking interval of each horizontal line of the television signal. The output of the separator is coupled to the input of a switch control pulse generator 136. Upon the detection of the leading edge of the horizontal sync pulse, the separator 134 issues a command to the pulse generator 136. After an interval of approximately 6 microseconds, the pulse generator 136 issues a pulse lasting about 2.0 microseconds for actuating the switching device 126 to its sampling and storing state. Thus, in response to the appearance of a horizontal sync pulse at the input to the A/D converter 111, separator 134 and pulse generator 136 cause switching device 126 to apply the encoding X3 reference clock signal to the clock input (CL) of the converter 111, which responsively digitizes a selected number of cycles of the signal's color burst. The timing of the operations of the separator 134 and pulse generator 136, as specified herein, is arranged for NTSC television signals so that the switching device 126 is actuated to its sampling and storing mode during the middle interval of the color burst interval. It is desired to arrange the sampling and storing of digital representations of the signal's color burst to occur in the middle of the color burst interval because this interval is the most accurate and reliable in representation of the color synchronizing burst frequency. In addition, the derivation of the information-signal-related clock signal is less susceptible to errors that may be introduced by small changes in the location of the color burst on the back porch of the horizontal blanking interval.

To condition the recyclable store 123 to store five cycles of the color burst digital representations, a burst detector 137 is connected to the input of the compensator 110. Upon the occurrence of the color burst in the incoming television signal, the burst detector 137 issues command on line 138, which extends to the write enable input (WE) of the recyclable digital storage. This command causes the store 123 to write the multibit binary words appearing at output 112 from the A/D converter 111. The actual writing or storage operation occurs at each reference clock time determined by a clock signal input to storage 123 from X3 reference clock 128. The ensuing operation of recyclable store 123 may be best described with reference to both FIGS. 1 and 2.

With reference to FIG. 2, store 123, includes a random access memory 139 having conventional write and address control inputs, as indicated by (W) and (A) symbols respectively. A binary word input is connected for receiving the multi-bit binary word at output 112 of the A/D converter 111. A binary word output is provided for issuing the recycled digital signals to line 140. An address generator 141 is responsive to a source of X3 reference clocking signals over line 122 and provides over a connection 142 for write and read access to memory 139 in accordance with the generated address signal. Included within store 123 is a write clock generator 143 responsive to the command received over line 138 from burst detector 137. The command sets the write clock generator 143 to issue over line 144 write enable signals to the write enable input (W) of the random access memory 139 each time a X3 reference clock is received from line 122. As long as write enable signals are received by the random access memory 139, the binary words issued by the A/D converter 111 will be written for storage in the memory 139. The store 123 also includes a counter 145 responsive to the command received over line 138 from burst detector 137. The command resets the counter 145 for counting addresses issued by the address generator 141. Each time the counter 145 is reset, it issues a reset command over line 146. This reset command is coupled to disable the write clock generator 143 by resetting it until the next command is issued by the burst detector 137. In this manner, the random access memory 139 is prevented from receiving further binary word representations of the television signal after the fifteen samples of the color burst. The counter 145 also serves to recycle the address generator 141. Each time the address generator 141 issues an address signal, the counter 145 is clocked by a X3 reference clock signal received from line 122 to examine via a line 147 the address issued by the address generator 141. When the counter 145 detects the issuance of the last of fifteen address signals issued by the address generator 141, it issues a reset command to the address generator over line 146. The counter also uses the reset command internally to reset itself. In this manner, the address generator 141 is continuously cycled through the fifteen addresses identifying the locations in the random access memory 139 in which the fifteen multi-bit binary words representing the five sampled cycles of signal color burst are stored. A further explanation of the operation of the recyclable store 123 will be provided herein with a description of an actual operating sequence of the compensator 110.

In selecting the rate at which the incoming information signal must be sampled, the clocking or sampling frequency must be at least two times the maximum signal frequency which the system is to pass without substantial degradation. Furthermore, the clocking rate and storage capacity of the random access memory 139 must be selected such that the number of digitized samples stored in the random access memory 139 equals an integral number of full cycles of the timing component signal. With the clocking rate and storage capacity thusly selected, the random access memory 139 carries an integral number of binary representations of full cycles of the timing component signal, which when recycled results in the generation of a continuous clock signal during the recycling mode. In the case of a color television signal, both the storage capacity and the sampling rate criteria are advantageously satisfied by selecting the encoding clock signal to have a frequency three times the color burst frequency and by storing fifteen samples of the color burst. Accordingly, in the exemplary embodiment, X3 signal clock 131 includes a frequency multiplier for multiplying by a factor of three the derived color burst signal developed by store 123, D/A converter 133 and the bandpass filter 132. It is observed that the frequency of the encoding clock signal employed during the sampling and storing mode must be nominally equal to the established encoding rate, although the phase may differ from the derived clock signal in accordance with the time-base error of the signal being compensated.

In the embodiment of FIG. 1, the basic reference timing signal is the reference color subcarrier available, for example, from the studio reference source for synchronizing all of the studio equipment for broadcast purposes. This reference color subcarrier is applied to a reference signal processor 148 which is a conventional component providing for compensation of fixed delays existing in cables and the like, and for developing the necessary phase alteration of the reference signal for European color systems, such as PAL (phase alternating line). The output of the processor 148 provides the basic reference timing signal relative to which the compensator 110 operates to compensate the incoming television signal. Because of the need of a X3 reference clock signal, the frequency of the basic reference timing signal is multiplied by a factor of three by a frequency multiplier included in the X3 reference clock source or generator 128. Since a X1 reference clock signal is required by the most preferred form of the compensator 110, a X1 reference clock generator 149 is coupled to receive the reference timing signal from the processor 148 and provides over line 121 the required X1 reference clock signal.

In accordance with the foregoing selection of encoding and decoding clock rates, the A/D converter 111 functions to develop a separate binary word at each of the three clock times occurring during the period equal to one cycle of the color burst. In this instance, A/D converter 111 is designed to provide an 8-bit word at each clock time, with these 8 bits providing a 0 to 256 amplitude level capacity for the digital representation of the incoming television signal. Recyclable digital store 123, therefore, has a 15-word capacity, again with each word consisting of 8bits. As there are three sampling points for each cycle of the color burst, store 123 provides for storing five full cycles of the digitally represented color burst. In operation, when the pulse generator 136 issues the 2 microsecond pulse in response to the detection of the horizontal sync pulse, the memory 139 is commanded by write clock generator 143 to write or store the binary words occurring at output 112 of the A/D converter 111 at the instance of each X3 referenced clock signal received over line 122. With reference to FIG. 2, this operation in particular provides for address generator 141 accessing a new word store in memory 139 in response to each of the X3 reference clock pulses, each newly accessed word store receiving the instantaneous bit conditions of the binary word at output 112. The 2 microsecond pulse issued by the pulse generator 136 also temporarily sets the switching device 126 in its sampling and storing state, thereby coupling the X3 reference clock signal to clock the A/D converter 111.

After the five cycles of the digital color burst have been stored, the storing operation is terminated by the counter 145 detecting via line 147 the fifteenth address generated by the address generator 141 following the 2 microsecond pulse and the issuance of a reset command to the write clock generator 143. The reset command disables the write clock generator, thereby removing write enable signals from the random access memory 139.

Following the termination of the sampling and storing mode, the address generator 141 continues to access memory 139 in response to the X3 reference clocking signal over line 122 repeating in sequence the same 15-word locations accessed during the write operation. This causes the stored 8-bit words to be successively read out over output line 140 to the D/A converter 133. The read function of memory 139 is permanently disposed in an active mode, such that the stored binary words are continuously read out over line 140 and this read function is operational during the storage of new digital information received from the A/D converter 111 by the operation of a by-pass switch 151. The switch 151 has two inputs and one output. One input of the by-pass switch 151 is connected by line 153 to the output of the random access memory 139 and the other input is connected by the by-pass line 154 to the line 112 at the input of the store 123. While set to provide write enable signals during the sampling and storing mode, the write clock generator 143 conditions the by-pass switch 151 to connect lines 112 and 140, thereby passing directly to the output the binary words being stored in the memory 139. At the end of the sampling and storing mode, the write clock generator 143 is disabled, hence, placing the switch 151 in a condition to couple output line 153 of the memory 139 to the line 140. The switch 151 remains in this condition during the entire recycling mode, enabling the stored color burst words to be coupled to the D/A converter 133 for derivation of the information-signal-related clock signal. The provision of the by-pass switch 151 enables the X3 clock signal circuits to be readied for the generation of derived X3 clock signal.

During the recycling mode, the address generator 141 and counter 145 function together to cause the repetitive generation of the same address sequence. This results in the binary words stored in the memory 139 being repetitively read in such sequence throughout the remaining duration of the horizontal line interval following the color burst.

FIGS. 3A and 3B illustrate the manner in which the derived clock signal is generated to be in-phase with the timing component of the information signal from which it is derived. FIG. 3A illustrates the condition that would exist if the incoming color television signal was without error. During the sampling and storing interval, the X3 reference clock causes the sampling of the signal's color burst in the A/D converter 111 and the storing of the sample values in the recyclable store 123. Because the incoming television signal is without error, the first sample of each cycle of the signal's color burst occurs at the beginning of the color burst cycle. Upon the recycling of the 15-words stored in store 123, the output of the filter 132 will be in-phase with the color burst contained in the incoming television signal. If a time-base error exists in the incoming television signal, as illustrated by FIG. 3B, the sample values represented by the binary words obtained from the A/D converter 111 will be different. This difference exists because of the timing difference between the reference timing signal and the incoming television signal, hence, the different sample points during the color burst cycle. Upon recycling the 15-words stored in store 123, the derived color burst signal output by the filter 132 will be in-phase with the color burst contained in the incoming television signal. Hence, the signal clock derived from the filter output will always be in-phase with the timing component contained in the television signal regardless of time-base changes or errors that may occur therein.

While in this instance a random access memory, address generator and counter means have been employed for recyclable store 123, it will be appreciated that other digital storage circuitry may be used in place thereof. For example, a recycling shift register is capable of providing the function of store 123, as will be recognized by those skilled in the art.

To simplify the avoidance of errors in the re-timing of the digitized representations of the television signal output by the A/D converter 111 during the recycling mode, a time buffer 156 is employed having a 1-word serial to 3-word parallel converter 157 at its input and a complementary 3-word parallel to 1-word serial converter 158 at its output. The converters 157 and 158 are shown in FIG. 4. The succession of individual binary words developed at output 112 are passed into the serial-in-parallel-out converter 157. This converter 157 receives each of the succession of binary words at a clock rate of 3 times the recycled color burst signal by applying the clock pulses available on line 118 to this converter as indicated. The converter 157 is constructed to store three of the binary words generated at output 112 in a serial fashion such that each new word added to the converter shifts the last word out leaving the converter always loaded with three full binary words. The serially loaded information is transferred in parallel fashion through a clock isolator 163 (See FIG. 4) included in the time buffer 156 to the converter 158. The transfer time to the clock isolator 163 occurs at the clock time determined by clock pulses developed by a 1X signal clock 159 (See FIG. 1). The 1X signal clock is connected to the output of bandpass filter 132 so as to generate a clock pulse signal at the recycled color burst rate. In particular, the 1X signal clock 159 is provided by limiting the filter output and using a positive going leading edge of the thereby generated square waveform to provide the clocking pulses. Each positive going leading edge of the limited color burst signal identifies the beginning of a cycle of the color burst signal. Signal clock is connected to the time buffer 156 over a line 161. In this manner, the clock isolator 163 receives in response to each applied clock pulse the full contents of the converter 157, which as discussed above carries at all times three full binary words generated by the A/D converter 111 at output 112. Moreover, the three words received in a parallel format by the clock isolator 163 correspond to the three words developed during one cycle of the derived color burst.

The output of the converter 157 is a 24-bit word coupled to the input of the clock isolator 163. The isolator is able to simultaneously read and write the 24-bit words. Because the isolator 163 is able to read and write simultaneously, the clocking operations can occur on the input and output sides thereof with reference to different incoherent clock signals, thereby providing time buffering and the ability to re-time signals. To write or store the output of the converter 157, clock signals generated by signal clock 159 are coupled by line 161 to write address (WA) and write enable (WE) inputs of the isolator 163. This clock signal is in-phase with the color burst of the uncorrected television signal. The stored 24-bit words associated with each cycle of the timing component are read or output from the isolator 163 in response to 1X reference clock signals provided by a reference clock 149 and coupled to a read address (RA) input of the isolator 163 over line 121.

By clocking the isolator 163 with the two clock signals, the phase of output of the isolator will be re-timed and synchronized to the reference color subcarrier phase.

Converter 158 is the complement of converter 157 in that it provides a parallel-in-serial-out transfer of the digital word information received from converter 157 through clock isolator 163. Converter 158 thus reconverts the digital information to a 1-word serial format, however, in this instance the serial words are clocked out of the converter 158 at a clock time determined by the 1X reference clock applied to converter 158 over line 121, as indicated in FIG. 4. These serial words are applied over line 119 to the input of the D/A converter 113 and, thereupon, decoded under the control of the 3X reference clock present on line 122. The D/A converter 113 provides the desired analog signal at output 114 synchronized to the reference subcarrier phase.

In the foregoing manner, the digital compensator of this invention functions to synchronize an incoming information signal with a reference or standard timing signal. It is observed that the range of time correction is the comma symbol (,) in the present embodiment, a period corresponding to a full cycle of the timing component. More particularly, in the case of a color television signal, the correction range is one cycle of the color burst frequency which is one divided by 3.58 megahertz or approximately 0.28 microseconds. If the phase error of the incoming television signal is likely to exceed this range, such as may occur when reproducing television signals from tape recorders, then the signal issued at output 114 will be shifted so as to synchronize the phase of the color burst component to the reference color subcarrier. However, the horizontal sync of the television signal will be improperly phased relative to the reference horizontal sync signal. For certain applications, such as in conjunction with disk recording equipment, the correction range of one full cycle of color burst or 0.28 microseconds provided by this embodiment is adequate without the aid of additional time-base error compensating systems.

If larger time-base errors are likely to be present, a random access memory 164 is inserted between the clock isolator 163 and the parallel-to-serial word converter 158, as shown in FIG. 4. The memory 164 corrects the timing of the signal by increments equal integral whole numbers of the period of one cycle of color burst. This is accomplished by writing the 24-bit word at addresses in the memory 164 determined by a write address generator 166. The memory 164 is enabled at its enable input (WE) to write the 24-bit word and the generator 166 is clocked by the 1X reference clock on line 121. The contents of the memory 164 is read according to the address provided by a read address generator 167. The read address supplied by generator 167 is determined by the relative time of the occurrences of the horizontal sync pulse of the incoming television signal and reference horizontal sync pulses. The relative time of occurrences is determined by a counter serving as a horizontal sync comparator 168. The counter 168 is started to count in response to the reference horizontal sync and is stopped by the occurrence of the television signal's horizontal sync. The counter 168 counts at the rate of color burst. The output of the counter 168 changes the address output by the read address generator 167 in accordance with the number in the counter 168 following the occurrence of the television signal's horizontal sync.

The successive 24-bit words are written at sequential addresses of the memory 164. The capacity of the memory 164 can be adjusted as desired. For a correction of at least one horizontal line interval, i.e., about 63.5 microseconds, the memory 164 is arranged to have a capacity of 256 words. Each word represents a time of one period of color burst, i.e., about 0.28 microseconds. Therefore, a capacity of 256 words will provide in excess of 63.5 microseconds of storage. The read address generator 167 is set relative to write address generator 166 so that if the signal horizontal sync and reference horizontal sync are in phase, identical addresses generated by the two generators will be separated in time by about one-half the capacity of the memory, with the write address generation in advance of the read address generation. For a one horizontal line interval correction capacity, the separation is about 32 microseconds.

The foregoing construction and operation of this invention applies to a system for correcting an information signal having a recurrent timing component in the form of a burst of alternating amplitude variations, such as color burst. This invention is also capable of time-base error compensation of information signals lacking or having timing components in a form other than an alternating amplitude timing signal. For example, a monochrome television signal may be corrected in accordance with the principles of the present invention by inserting an artificial burst signal consisting of a burst of alternating amplitude variations into the television signal during a blanking interval thereof. In particular, such a burst signal may be added to the back porch of each blanking waveform accompanying a horizontal line of the monochrome television signal, wherein the horizontal synchronizing pulse serves as the timing component to which the inserted pilot signal is selected to have a predetermined phase relationship.

With reference to FIG. 5, a modification of circuit system of FIG. 1 is illustrated for compensating a monochrome television signal by inserting an artificial burst signal consisting of a burst of alternating amplitude timing information. Burst insertion is provided by a ringing oscillator burst generator 171 having an input controlled by the uncorrected monochrome horizontal sync provided by the sync separator 134. An output 173 of generator 171 is provided for issuing a burst of alternating amplitude timing information for insertion into the monochrome video signal at a summing junction 174 by a lead 177 from a gate 176. Junction 174 is provided by a conventional signal summing circuit. By this arrangement the generated burst waveform is inserted in the monochrome video prior to application of the incoming signal to the encoding A/D converter 111, in this instance. Such arrangement is operable only by the absence of a subsequently occurring color burst and to this end a connection is made from the output of the burst detector 137 to gate 176 to disable the gate.

Apart from the fact that in the embodiment of FIG. 5 the burst signal is artificially generated and inserted, this embodiment for processing monochrome television signals functions in substantially the same manner as the embodiment for processing color television signals illustrated by FIG. 1. The artificial burst generator 171 is designed so as to generate a burst signal having the same frequency and phase relationship as a color burst, so that the standard reference color subcarrier may be employed as the reference timing signal in the monochrome circuit of FIG. 5. This is achieved in accordance with the present invention by generator 171 receiving from sync separator 134 the horizontal sync pulse of each monochrome television line as it appears in the incoming television information signal and employing the leading edge of the horizontal sync pulse to trigger a phase controlled ringing circuit designed to provide a frequency of oscillation equal to that of the standard color burst which in turn is nominally equal to the frequency of the reference color subcarrier. The phase of the output burst signal generated by ringing circuit generator 171 is controlled in accordance with a divide by 2 flip-flop 179 having an input responsive to the leading edge of the horizontal sync pulse as developed by sync separator 134 and having a pair of outputs 181 and 182 corresponding to opposite sides of flip-flop 179 and thus issuing signals which are 180° opposed. The purpose of divide by 2 flip-flop 179 is to drive phase controlled ringing oscillator 171 such that it develops a 180 phase change at each television line so as to conform the artificially generated burst signal to the standard phase alternation existing between color burst and sync timing in a standard color system.

Accordingly, flip-flop 179 responds to each horizontal sync pulse by changing states. In response to a first horizontal sync pulse received from separator 134, output 181 will switch from a low to a high state while output 182 will simultaneously switch from a high to a low condition. The next horizontal sync pulse will cause an opposite transition. Phase control ringing oscillator 171 is designed to respond only to output transitions from outputs 181 and 182 exhibiting a low to high change in condition.

As each burst of the artificial burst appears at output 173 following the horizontal sync pulse, the pulse output provided by the pulse generator 136 actuates the gate 176 by disposing it in its set condition. Also a mono/color switch 183 is set to couple the pulse from the pulse generator to control the recyclable store 123 in place of the burst detector 137.

I claim:

1. A compensator for synchronizing relative to a reference clock signal an information signal having a timing component, comprising; an analog to digital converter receiving and digitally encoding said information signal in response to clock signals, reference clock signal source means, digital memory means including input and output means, switching means having first and second states, said switching means in its first state connecting said reference clock signal source means to said analog to digital converter for clocking said analog to digital converter to encode the information signal at a rate coherent with said reference clock signal, means connecting said digital memory means to an output of said analog to digital converter while said switching means is in its first state for storing and regenerating said timing component of said information signal, said switching means in its second state connecting the output of said digital memory means to said analog to digital converter for clocking said analog to digital converter to encode the information signal at a rate coherent with said timing component of said information signal, said switching means responsive to said information signal to assume temporarily its first state, and a digital to analog converter coupled to receive the output of said analog to digital converter for decoding the digitized information signal, said reference clock signal source means coupled to said digital to analog converter for clocking said digital to analog converter at a rate coherent with said reference signal.

2. Apparatus for altering the time-base of an information signal relative to a reference signal defining a known time-base, the information signal having a time varying time-base synchronizing component of a known nominal frequency, comprising; a sampler for receiving and sampling the information signal in response to control signals; means for alternately coupling a first control signal and a second control signal to said sampler to effect sampling of the information signal, said first control signal having a time-base determined by the time-base of the reference signal and coupled by said coupling means to said sampler during an interval of the time-base synchronizing component for generating the second control signal during the time between successive couplings of the first control signal to the sampler, said second control signal having a time-base determined by the time-base defined by the synchronizing component.

3. The apparatus according to claim 2 wherein the second control signal is generated by means which includes a signal store responsive to the reference signal to receive and store for repetitive presentation at an output thereof the samples of the time-base synchronizing component provided by said sampler, said repetitive presentation of stored samples providing the second control signal.

4. The apparatus according to claim 3 wherein said means for alternately coupling control signals is a switching means having first and second states, said switching means responsive to the information signal to assume its first state during an interval of the time-base synchronizing component, said switching means assuming its second state at other times during the time between successive intervals of the time-base synchronizing component, said switching means coupling the first control signal to the sampler while in its first state and coupling the second control signal to the sampler while in its second state.

5. The apparatus according to claim 4 wherein the sampler is an analog to digital converter responsive to clock signals for sampling and digitally encoding the information signal, the first control signal is a first clock signal, the signal store is a recyclable digital memory responsive to the first clock signal for storing and repetitively presenting at an output the digitally encoded samples of the time-base synchronizing component to generate the second control signal as a second clock signal.

6. The apparatus according to claim 5 wherein the interval during the time-base synchronizing component during which the switching means assumes its first state corresponds to a selected integral number of cycles of the time varying time-base synchronizing component, and the recyclable digital memory stores the digitally encoded samples of the time-base synchronizing component received during the interval and repetitively presents the stored samples continuously between successive couplings of the first clock signals in the sequence such samples are stored.

7. The apparatus according to claim 5 wherein the second control signal generating means includes a digital to analog converter coupled to the output of the recyclable digital memory for decoding the digitally encoded time-base synchronizing component samples presented at said output; and a bandpass filter means coupled to receive the decoded time-base synchronizing component and provide a filtered representation thereof, the bandpass filter set with a center frequency substantially equal to the nominal frequency of the time varying time-base synchronizing component.

8. The apparatus according to claim 7 wherein the second control signal generating means includes a switching means responsive during the interval that the digitally encoded samples of the time-base synchronizing component are received by the recyclable digital memory to couple the received samples to the digital to analog converter of said second control signal generating means.

9. The apparatus according to claim 8 wherein the bandwidth of the bandpass filter is selected to effect averaging the noise present in the decoded time-base synchronizing component.

10. The apparatus according to claim 7 wherein the first clock signal has a frequency greater than two times the nominal frequency of the time varying time-base synchronizing component whereby more than two digitally encoded samples per cycle of the time-base synchronizing component are obtained, the switching means is in its first state for an interval during the time-base synchronizing component so that the total number of digitally encoded samples obtained equals an integral number of said cycles, and the second control signal generating means includes a frequency multiplier coupled to receive the filtered representation of the decoded time-base synchronizing component and provide a frequency multiple thereof as the second clock signal, said frequency multiplier selected to provide a multiplication factor corresponding to the number of samples per cycle of the time-base synchronizing component.

11. The apparatus according to claim 10 wherein the first clock signal has a frequency equal to three times the nominal frequency of the time varying time-base synchronizing component, and the switching means is in its first state for an interval corresponding to five cycles of the time-base synchronizing component.

12. The apparatus according to claim 5 further comprising a digital memory means coupled to the analog to digital converter to receive the digitally encoded samples of the information signal and store the samples during the time between successive sampled intervals of the time-base synchronizing component for a duration determined by the difference between the time-base defined by the reference signal and the time-base defined by the time-base synchronizing component.

13. The apparatus according to claim 12 further comprising a digital to analog converter coupled to receive the digital encoded samples of the information signal after storage in the digital memory means for the determined duration for decoding the digitally encoded samples to provide a reconstituted information signal.

14. The apparatus according to claim 12 wherein the digital memory means includes a first digital store coupled to the analog to digital converter, said first digital store responsive to the second clock signal to enter for storage the digitally encoded samples from the analog to digital converter, and said first digital store responsive to the first clock signal to retrieve from storage and present at an output thereof the stored digitally encoded samples; a second digital store coupled to the output of the first digital store and responsive to the first clock signal to enter for storage the digitally encoded samples retrieved from the first digital store; and means for retrieving the store digitally encoded samples from the second digital store at times determined by the time difference between the time-base of the reference signal and the time-base of the sychronizing component in integral numbers of cycles of the reference signal.

15. The apparatus according to claim 14 wherein the information signal includes a periodically occurring first time-base synchronizing component defining successive intervals of the information signal and a second time-base synchronizing component following each first synchronizing component, the second synchronizing component having a frequency higher than the frequency of occurrence of said first synchronizing component and defining the time varying time-base synchronizing component, said first and second synchronizing components having a nominal fixed time relationship; the frequency of the reference signal is related to that of the second synchronizing component; and the means for retrieving the stored digitally encoded samples from the second digital store includes means for comparing the time relationship of each periodically occurring first time-base synchronizing component and a second reference signal defining a second known time-base to provide a signal representative of their time difference in integral numbers of cycles of the reference signal, the frequency of the second reference signal is related to the nominal frequency of the first synchronizing component, and means for adjusting the time of retrieval of the stored digitally encoded samples in accordance with the time difference representative signal.

16. The apparatus according to claim 15 wherein the second digital store is a random access memory having a write address input, a read address input and a data input, said data input coupled to the output of the first digital store; further comprising a write address generator responsive to the first clock signal to generate a sequence of write address signals coupled to the write address input, said random access memory responsive to each coupled write address signal to store the digitally encoded sample at the data input; and wherein the means for retrieving the stored digitally encoded samples from the second digital store includes a read address generator for generating a sequence of read address signals coupled to the read address input, said read address generator responsive to the first clock signal to generate each read address signal at a time between generations of successive write address signals, and the means for adjusting the time of retrieval of the stored digitally encoded samples is responsive to the signal provided by the time difference comparing means to set the read address generator at the beginning of each of the successive intervals of the information signal to provide a first address signal of the sequence in accordance with the time relationship represented by the provided time difference signal.

17. Apparatus according to claim 15 wherein the information signal is a television signal including periodically occurring line pulses defining the successive intervals of the information signal and an amplitude time varying signal defining the second time-base synchronizing component following each line pulse.

18. Apparatus according to claim 17 wherein the switching means is responsive to each occurrence of a line pulse to assume its first state for a following interval during the second time-base synchronizing component corresponding to a selected number of cycles defined by the nominal frequency second time-base synchronizing component; the first clock signal has a frequency greater than two times the nominal frequency of the second time-base synchronizing component whereby more than two digitally encoded samples per nominal cycle of the second time-base synchronizing component are obtained, the number of nominal cycles that the switching means assumes its first state is selected to provide a total number of digitally encoded samples of the second time-base synchronizing component equal to an integral number of nominal cycles of the second time-base synchronizing component; and the second control signal generating means provides a second clock signal of a nominal frequency signal equal to the frequency of the first clock signal.

19. Apparatus according to claim 17 further comprising means for inserting an artificially generated amplitude time varying signal in the information television signal at a predetermined location relative to each line pulse prior to the television signal being digitally encoded, the artificially generated signal having a frequency that is higher than the frequency of occurrence of the line pulses.

20. Apparatus for altering the time-base of an information signal relative to a reference signal defining a known time-base, the information signal having a time varying time-base synchronizing component of a known nominal frequency, comprising; means responsive to the synchronizing component and the reference signal for providing a first signal representative of the time difference between said synchronizing component and reference signal corresponding to a fraction of one cycle of said nominal frequency; means responsive to said first signal for receiving and storing the information signal for a time corresponding to the represented fraction of said cycle; means for providing a second signal representative of the time difference between said synchronizing component and said reference signal corresponding to an integral number of cycles of said nominal frequency, and means responsive to said second signal for receiving the stored information signal and further storing it for a time corresponding to the represented integral number of said cycle.

21. The apparatus according to claim 20 further comprising means responsive to the time-base synchronizing component of the information signal for regenerating the time-base synchronizing component, and means for coupling the reference time-base signal and the regenerated time-base synchronizing component to the receiving and storing means for controlling the time of the storage of the information signal.

22. A time base compensator for synchronizing a television signal to a stable time-base reference signal, said television signal having line pulses at intervals of the television signal and a time varying time-base synchronizing component following the occurrence of each line pulse, said synchronizing component having a frequency higher than the frequency of occurrence of the line pulses, comprising; a sampler for receiving and sampling the television signal in response to clock signals; means for alternately coupling a first clock signal and a second clock signal to said sampler to effect sampling of the television signal during the interval between successive line pulses, said first clock signal having a time-base determined by the time-base of said reference signal and coupled by said coupling means to said sampler during an interval of the time-base synchronizing component, said second clock signal coupled to said sampler by said coupling means during the interval between successive line pulses following said interval of the time-base synchronizing component; and means responsive to the samples provided by the sampler during the interval of the time-base synchronizing component for generating the second clock signal during the interval between successive line pulses, said second clock signal having a time-base determined by the time-base defined by the synchronizing component.

23. The time base compensator according to claim 22 wherein the second clock signal generating means includes a signal store responsive to the time-base reference signal to receive and store for repetitive presentation at an output thereof the samples of the time-base synchronizing component provided by said sampler to generate the second clock signal.

24. The time base compensator according to claim 23 wherein said means for alternately coupling clock signals is a switching means having first and second states, said switching means responsive to the television signal to assume its first state during the interval of the time-base synchronizing component, said switching means assuming its second state during the interval between successive line pulses other than during said interval of the time-base synchronizing component, said switching means coupling the first clock signal to the sampler while in its first state and coupling the second clock signal to the sampler while in its second state.

25. The time-base compensator according to claim 24 wherein the sampler is an analog to digital converter responsive to clock signals for sampling and digitally encoding the television signal, and the signal store is a recyclable digital memory responsive to the first clock signal for storing and repetitively presenting the digitally encoded samples of the time-base synchronizing component to generate the second clock signal.

26. The time base compensator according to claim 25 wherein the means for generating the second clock signal includes a digital to analog converter coupled to the output of the recyclable digital memory for decoding the digitally encoded time-base synchronizing component samples presented at said output; and a bandpass filter means coupled to receive the decoded time-base synchronizing component and provide a filtered representation thereof, the bandpass filter set with a center frequency substantially equal to the nominal frequency of the time-base synchronizing component.

27. The time base compensator according to claim 26 wherein the second clock signal generating means includes a switching means responsive during the interval that the digitally encoded samples of the time-base synchronizing component are received by the recyclable digital memory to couple the received samples to the digital to analog converter of said second clock signal generating means.

28. The time base compensator according to claim 25 further comprising a digital memory means coupled to the analog to digital converter to receive the digitally encoded samples of the television signal during the interval between successive line pulses and store each of the samples for a duration determined by the difference between the time-base defined by the reference signal and the time-base defined by the synchronizing component occurring during said interval.

29. The time base compensator according to claim 28 further comprising a digital to analog converter coupled to receive the digitally encoded samples of the television signal after storage in the digital memory means for the determined duration for decoding the digitally encoded samples to provide a reconstituted television signal.

30. The time base compensator according to claim 28 wherein the switching means is responsive to each occurrence of a line pulse to assume its first state for a following interval during the time-base synchronizing component corresponding to a selected number of nominal cycles defined by the nominal frequency time-base synchronizing component; the first clock signal has a frequency greater than two times the nominal frequency of the time-base synchronizing component whereby more than two digitally encoded samples per nominal cycle of the time-base synchronizing component are obtained, the number of nominal cycles that the switching means assumes its first state is selected to provide a total number of digitally encoded samples of the time-base signal equal to an integral number of nominal cycles of the time-base synchronizing component; and the second clock signal generating means provides a second clock signal of a nominal frequency equal to the frequency of the first clock signal.

31. The apparatus according to claim 30 wherein the digital memory means includes a first digital store coupled to the analog to digital converter, said first digital store responsive to the clock signals provided by the switching means during each interval between successive line pulses to enter for storage the digitally encoded samples from the analog to digital converter, and said digital store responsive to the first clock signal during each interval to retrieve from storage and present at an output thereof and stored digitally encoded samples; a second digital store coupled to the output of the first digital store and responsive to the first clock signal during each interval to enter for storage the digitally encoded samples retrieved from the first digital store; and means for retrieving the stored digitally encoded samples from the second digital store at times determined by the time difference between the reference signal and the time-base synchronizing component in integral numbers of cycles of the reference signal.

32. The time base compensator according to claim 31 wherein the television signal is a color television signal having a color signal related higher frequency time-base synchronizing component following the occurrence of each line pulse.

33. The time base compensator according to claim 32 further comprising means responsive to the color signal related time-base synchronizing component to enable the recyclable digital memory to receive and store the digitally encoded sample of the color signal related time-base synchronizing component in response to first clock signals.

34. The time base compensator according to claim 33 further comprising means for inserting an artificial time-base synchronizing component in the television signal at a predetermined location relative to each line pulse prior to the television signal being digitally encoded, and means responsive to the television signal to detect the absence of the color signal related time-base synchronizing component to enable the means for inserting the artificial time-base synchronizing component.

35. A method of changing the time-base of an information signal including a time-base synchronizing component of a known nominal frequency comprising the steps of generating a first signal representative of a fraction of one cycle of said nominal frequency; generating a second signal representative of an integral number of cycles of said nominal frequency; displacing the information signal in time by the fraction of the cycle represented by the first signal; and further displacing the fractionally displaced information signal in time by the integral number of cycles represented by the second signal.

36. The method according to claim 35 wherein the step of generating the first signal includes generating a control signal coherent with that of the time-base synchronizing component included in the information signal, and the step of fractionally time displacing the information signal includes storing the information signal at times determined by the control signal for an interval corresponding to the fraction of the cycle; and the step of further time displacing the fractionally displaced information signal includes further storing the information signal for the time corresponding to the integral number of cycles.

37. The method according to claim 36 wherein the step of generating a control signal includes regenerating the time-base synchronizing component from that included in the information signal.

38. The method according to claim 37 wherein the steps of storing the information signal includes entering the information signal into a store at times determined by the regenerated time-base synchronizing component, and retrieving the stored information signal from the store at times determined by the difference between the time-base defined by a reference time-base signal and the time-base defined by the synchronizing component.

39. The method according to claim 38 wherein the step of storing the information signal for a fraction of the nominal cycle of the synchronizing component includes entering the information signal into a store at times determined by the regenerated time-base synchronizing component, and retrieving the stored information signal from the store at times determined by the reference time-base signal, said reference time-base signal having a frequency related to the nominal frequency of the time-base synchronizing component.

40. The method according to claim 39 wherein the step of further storing the information signal includes entering the retrieved stored information signal into a store at times determined by the reference time-base signal, and retrieving the further stored information signal from the store at times determined by a time-base synchronizing component of the information signal.

41. The method according to claim 40 wherein the information signal includes a periodically occurring first time-base synchronizing component and a second time-base synchronizing component having a frequency higher than the frequency of occurrence of said first synchronizing component, said second synchronizing component defining the time-base synchronizing component, said first and second time-base synchronizing components having a nominal fixed time relationship; the frequency of the reference time-base signal is related to the frequency of the second time-base synchronizing component; the control signal generating step includes regenerating the second time-base synchronizing component continuously during the interval defined by successive first time-base synchronizing components; and the further stored information signal is retrieved from store at times determined by the periodically occurring first time-base synchronizing component.

42. The method according to claim 41 wherein the information signal is a television signal including periodically occurring line time-base synchronizing pulses and an amplitude time varying time-base synchronizing component.

43. The method according to claim 42 wherein the television signal is a color television signal, and the amplitude varying time-base synchronizing component is a color synchronizing burst immediately following the occurrence of each line synchronizing pulse.

44. The method according to claim 42 further comprising the step of inserting an artificially generated time-base signal component at a predetermined location in the information signal relative to each line synchronizing pulse, the artificially generated time-base synchronizing component having a frequency higher than the frequency of occurrence of the line synchronizing pulses.

45. The method according to claim 36 further including the step of inserting an artificially generated time-base synchronizing component at predetermined intervals of the information signal.

46. A method of changing the time-base of an information signal including a time-base synchronizing component of a known nominal frequency comprising the steps of generating a first signal representative of a fraction of one cycle of said nominal frequency; storing the information signal for a time corresponding to the fraction of the cycle represented by the first signal; generating a second signal representative of an integral number of one cycle of said nominal frequency; and further storing the information signal for a time corresponding to the integral number of cycles represented by the second signal.

47. The method according to claim 46 further comprising the steps of regenerating the time-base synchronizing component of the information signal; periodically sampling the information signal at times determined by the regenerated time-base synchronizing component, each sample first stored for a time corresponding to the fraction of said nominal cycle, each sample further stored for a time corresponding to the integral number of said nominal cycles; and reconstituting the information signal from the further stored samples.

48. The method according to claim 47 wherein the information signal includes a second time-base synchronizing component at intervals thereof; the periodic sampling of the information signal is determined by the first named time-base synchronizing component regenerated during the interval between successive second time-base synchronizing component; and each sample during said interval stored and further stored for times corresponding to the nominal cycle of the first named time-base synchronizing component occurring during the interval between successive first time-base components.

49. The method according to claim 47 wherein the information signal includes a periodically occurring first time-base synchronizing component and a second time-base synchronizing component having said known nominal frequency which is higher than the frequency of occurrence of said first time-base synchronizing component, said first and second time-base synchronizing components having a nominal fixed time relationship, successive ones of said first time-base synchronizing component defining intervals of the information signal; and the time-base synchronizing component regeneration step includes regeneration the second time-base synchronizing component occurring during the interval defined by successive first time-base synchronizing components.

50. The method according to claim 49 wherein the information signal is a television signal including periodically occurring line time-base synchronizing pulses and an amplitude varying time-base synchronizing component.

51. The method according to claim 47 wherein the information signal includes a component from which intervals thereof can be determined; the step of periodically sampling the information signal includes first sampling each interval at times determined by a reference time-base signal to obtain samples of the time-base synchronizing component occurring during the interval, and then sampling the information signal during the interval at times determined by the regenerated component; and the step of regenerating the time-base synchronizing component includes regenerating the samples of the time-base synchronizing component continuously during the interval.

52. The method according to claim 51 wherein the step of regenerating the samples of the time-base synchronizing component includes storing the samples at times determined by the reference time-base signal, and retrieving the stored samples continuously for the interval in the sequence of their storing at times determined by the reference time-base signal.

53. The method according to claim 51 wherein the steps of storing the information signal includes entering the samples of the information signal into a store at times determined by the regenerated samples of the time-base synchronizing component, and retrieving the stored samples of the information signal from the store for reconstitution of the information signal at times determined by the difference between the time-base defined by the reference time-base signal and the time-base defined by the synchronizing component.

54. The method according to claim 53 wherein the step of storing the information signal for a fraction of the cycle includes entering the samples of the information signal into a store at times determined by the regenerated samples of the time-base synchronizing component, and retrieving the samples from the store at times determined by the reference time-base signal; and the step of further storing the information signal includes entering the retrieved samples in a store at times determined by the reference time-base signal, and retrieving the further stored samples at times determined by a time-base synchronizing component of the information signal.

55. The method according to claim 54 wherein the information signal includes periodically occurring time-base synchronizing pulses defining intervals of the information signal and an amplitude varying time-base synchronizing component having a frequency higher than the frequency of occurrence of the synchronizing pulses, said time-base synchronizing pulses and amplitude varying time-base synchronizing component having a nominal fixed time relationship; the first sampling is at times to obtain samples of the amplitude varying time-base synchronizing component; and the further stored samples are retrieved at times determined by the periodically occurring time-base synchronizing pulses.

56. The method according to claim 55 wherein the information signal is a television signal including periodically occurring line-defining synchronizing pulses and an interval of the amplitude varying time-base synchronizing component following each pulse occurrence.

57. The method according to claim 56 wherein the step of regenerating the samples of the time-base synchronizing component includes storing samples of the amplitude varying synchronizing component following each line synchronizing pulse occurrence at times determined by the reference time-base signal, and retrieving the stored samples of the amplitude varying synchronizing component continuously for the interval defined by successive line synchronizing pulses in the sequence of their storing at times determined by the reference time-base signal.

58. The method according to claim 57 wherein the reference time-base signal has a stable time-base; and the times for retrieving the further stored samples are determined by comparing the time of occurrence of the line synchronizing pulse preceding the amplitude varying synchronizing component to a second reference time-base signal having a stable time-base and a fixed time relationship to the first mentioned reference time-base signal.

59. The method according to claim 58 wherein the television signal is a color television signal, and the amplitude varying synchronizing component is a color burst synchronizing component.

60. A method of changing the time-base of an information signal including a time-base synchronizing component having a nominal frequency comprising the steps of sampling the information signal during periodic intervals thereof at times determined by a reference time-base signal to obtain samples of the time-base synchronizing component occurring during each of said intervals; deriving from the samples of the time-base synchronizing component obtained during each interval a control signal having a time-base coherent with that of the sampled time-base synchronizing component; and sampling the information signal between successive periodic intervals at times determined by the control signal derived from samples of the time-base synchronizing component obtained from the first of said successive periodic intervals.

61. The method according to claim 60 further comprising the step of storing the samples of the information signal for a time determined by the difference between the time-base defined by the reference time-base signal and the time-base defined by the control signal.

62. The method according to claim 61 wherein the step of storing the samples of the information signal includes entering the samples into a store at times determined by the derived control signal, and retrieving the stored samples from the store at times determined by the reference time-base signal.

63. The method according to claim 62 wherein the step of deriving the control signal includes regenerating the obtained samples of the time-base synchronizing component continuously after each interval in the sequence they were obtained.

64. The method according to claim 60 wherein the step of deriving the control signal includes regenerating the obtained samples of the time-base synchronizing component continuously after each interval in the sequence they were obtained.

65. The method according to claim 64 wherein the step of regenerating the obtained samples of the time-base synchronizing component includes storing the samples at times determined by the reference time-base signal, and retrieving the stored samples of the time-base synchronizing component continuously after each interval in the sequence of their storing at times determined by the reference time-base signal.

66. The method according to claim 65 wherein the information signal includes a periodically occurring first time-base synchronizing component defining successive recurrent periods of the information signal and a second time-base synchronizing component having a known nominal frequency that is higher than the frequency of occurrence of the first time-base synchronizing component, the first and second synchronizing components having a nominal fixed time relationship.

67. The method according to claim 66 further comprising the step of inserting an artificially generated time-base synchronizing component at a predetermined location in the information signal relative to each first time-base synchronizing component, the artificially generated time-base synchronizing component having a frequency that is higher than the frequency of occurrence of the first time-base synchronizing component.

68. The method according to claim 66 wherein the information signal is a television signal including periodically occurring line pulses defining the recurrent periods.

69. The method according to claim 68 wherein the reference time-base signal has a stable time-base.

70. The method according to claim 69 wherein the television signal is a color television signal including a color burst forming the second time-base synchronizing component following each line pulse occurrence.

71. The method according to claim 70 further comprising the step of storing the samples of the information signal for a time determined by the difference between the time-base defined by the reference time-base signal and the time-base defined by the color burst synchronizing component of the information signal.

72. The method according to claim 71 wherein the step of storing samples of the information signal includes entering the samples of the information signal into a store at times determined by regenerated samples of the second time-base synchronizing component formed by the color burst; and retrieving the stored samples of the information signal from the store at times determined by the stable time-base reference signal.

73. A method of processing video information signals to reduce time base errors, said method comprising the steps of:
 a. generating a first clock signal train having a variable rate determined by the frequency of first predetermined portions of said video signals;
 b. generating a second clock signal train having a variable rate determined by the frequency of second predetermined portions of said video signals, said second predetermined portions having a frequency range substantially less than the frequency range of said first predetermined portions;
 c. sampling said video signals at intervals defined by said first clock signal train;
 d. temporarily storing said sampled signals at said intervals defined by said first clock signal train; and
 e. fetching said stored signals at intervals defined by said second clock signal train.

74. The method of claim 73 wherein said step (c) of sampling includes the step of
converting said video signals to digital form, and further including the step of
(f) reconverting said fetched signals to analog form.

75. Apparatus for regenerating a time-base component of an information signal, comprising; means for sampling an interval of said time-base component at times during said interval determined by a stable time-base reference signal; means responsive to said time-base reference signal for receiving and storing the samples of said time-base component; and means for regenerating the stored samples in the order of their storage at times determined by said time-base reference signal during the time between successive sampled intervals of the time-base component.

76. The apparatus according to claim 75 wherein the time-base component samples received by the storing means are digital signals; the storing means is a recyclable digital memory responsive to said time-base reference signal; and the means for regenerating the stored samples of said time-base component includes means responsive to said time-base reference signal to command the recyclable digital memory to repetitively provide the stored samples of said time-base component in the order of their storage between the successive sampled intervals of the time-base component.

77. The apparatus according to claim 76 wherein the time-base component has a nominal frequency; and the number of samples of the time-base component corresponds to a selected integral number of one cycle of the nominal frequency of the time-base component.

78. The apparatus according to claim 77 further comprising a digital to analog converter coupled to receive the digital time-base component samples provided by the recyclable digital memory and provide a corresponding analog form thereof; and a bandpass filter means coupled to receive the analog form of the time-base component provided by the digital to analog converter and provide a filtered representation thereof, the bandpass filter set with a center frequency substantially equal to the nominal frequency of the time-base component.

79. The apparatus according to claim 78 further comprising a switching means responsive during the interval that the digital time-base component samples are received by the recyclable digital memory to couple the digital time-base component samples to the digital to analog converter as they are received by the recyclable digital memory.

80. The apparatus according to claim 77 wherein time-base component samples are received by the storing means at a rate corresponding to the frequency of the reference time-base signal; the reference time-base signal has a frequency greater than two times the nominal frequency of the time-base component whereby more than two digital samples per nominal cycle of the time-base component are received by the storing means; and the interval during which time-base component samples are received is selected so that the total number of time-base component samples obtained is equivalent to an integral number of said nominal cycles; and further comprising a frequency multiplier coupled to receive the filtered representation of the time-base component and provide a frequency multiple thereof, said frequency multiplier selected to provide a multiplication factor corresponding to the number of samples per nominal cycle.

81. The apparatus according to claim 80 wherein the reference time-base signal has a frequency of three times the nominal frequency of the time-base component; and the interval during which time-base components are received is selected so that samples corresponding to five nominal cycles of the time-base component are received by the storing means.

82. The apparatus according to claim 81 wherein the information signal is a color television signal having time-base components including line pulses defining line intervals of information and a color synchronizing signal following the occurrence of each line pulse; the storing means receives samples of an interval of the color synchronizing signal time-base component following each line pulse; and the regenerating means regenerates the stored color synchronizing signal samples during the time between the color synchronizing signals following the occurrences of successive line pulses.

83. Apparatus for changing the time-base of a digital information signal having a time-base synchronizing component, comprising: a randomly addressable digital store having addressed storage locations for receiving and storing successive intervals of the digital information; means for effecting the storage of successive portions of each interval of the digital information signal at different addressed storage locations of the digital store at times determined by a clock signal; means for effecting retrieval of the stored portions of the information signal from addressed storage locations at times determined by said clock signal; and means responsive to the time-base synchronizing component of the information signal and a time-base reference signal for providing a control signal representative of the time difference between the synchronizing component and the reference signal; and means responsive to said control signal for adjusting during each interval of the digital information signal the time between effecting storage of each portion of the digital information signal at an address and effecting retrieval of said portion from said address.

84. The apparatus according to claim 83 wherein the randomly addressable digital store has a data storage address input, a data retrieval address input and data input and output terminals; the storage effecting means includes a write address generator responsive to the clock signal to generate a sequence of address storage location identifying write address signals coupled to the data storage address input terminal, the randomly addressable digital store is responsive to each coupled write address signal to store at the addressed storage location the digital information signal at its data input terminal; and the retrieval effecting means includes a read address generator responsive to the clock signal to generate a sequence of address storage location identifying read address signals coupled to the read address input terminal, the randomly addressable digital store is responsive to each coupled read address signal to provide at its data output terminal the digital information signal stored at the addressed storage location.

85. The apparatus according to claim 84 wherein the read address generator is responsive to the time-base reference signal to generate each read address signal at a time between generations of successive write address signals.

86. The apparatus according to claim 84 wherein the means for adjusting the time between effecting storage and retrieval of portions of the digital information signal is coupled to set the read address generator at the beginning of each of the successive intervals of the digital information signal to provide a first of the sequence of read address signals.

87. The apparatus according to claim 86 wherein the digital information signal is a digitized television signal, said television signal having a time-base component including periodically occurring line pulses defining the successive intervals of the television signal; and the means for adjusting the time between effecting storage and retrieval of portions of the digital information signal includes means for comparing the time of occurrence of each line pulse relative to a stable time-base reference signal to provide a signal representative of the time difference between the line pulse and stable reference signal in integral numbers of a selected time increment, the read address generator is responsive to the representative time difference signal to provide the first read address signal of the sequence.

88. The apparatus according to claim 87 wherein the clock signal has a frequency higher than the nominal frequency of occurence of the line pulses included in the television signal, the selected time increment corresponds to a period defined by the clock signal.

89. The apparatus according to claim 88 wherein the television signal is a color television signal having a time-base component including a color synchronizing signal following the occurrence of each line pulse; and the frequency of the clock signal is fixed and corresponds to the nominal frequency of the color synchronizing signal.

* * * * *